(12) United States Patent
Frank et al.

(10) Patent No.: US 7,669,056 B2
(45) Date of Patent: Feb. 23, 2010

(54) METHOD AND APPARATUS FOR MEASURING PRESENTATION DATA EXPOSURE

(75) Inventors: Alexander Frank, Bellevue, WA (US); James Duffus, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 759 days.

(21) Appl. No.: 11/092,041

(22) Filed: Mar. 29, 2005

(65) Prior Publication Data

US 2006/0227364 A1    Oct. 12, 2006

(51) Int. Cl.
G06F 9/00 (2006.01)
H04L 9/32 (2006.01)
H04N 7/167 (2006.01)

(52) U.S. Cl. .......................... 713/176; 713/1; 380/229; 380/232

(58) Field of Classification Search .................. 726/22; 713/1, 176; 380/229, 232
See application file for complete search history.

(56) References Cited

U.S. PATENT DOCUMENTS

| 4,750,034 | A |  | 6/1988 | Lem |
| 4,855,730 | A | * | 8/1989 | Venners et al. ......... 340/825.24 |
| 4,857,999 | A |  | 8/1989 | Welsh |
| 4,967,273 | A |  | 10/1990 | Greenberg |
| 5,883,670 | A | * | 3/1999 | Sporer et al. ........... 375/240.25 |
| 6,061,794 | A | * | 5/2000 | Angelo et al. .................. 726/3 |
| 6,441,813 | B1 | * | 8/2002 | Ishibashi ..................... 345/213 |
| 2006/0206618 | A1 | * | 9/2006 | Zimmer et al. .............. 709/231 |

* cited by examiner

*Primary Examiner*—Nasser G Moazzami
*Assistant Examiner*—Mohammad W Reza
(74) *Attorney, Agent, or Firm*—Marshall, Gerstein & Borun LLP (57) ABSTRACT

A method and apparatus for measuring data presentation is measured for authenticity and accuracy using a cryptographic capability. The data may include both presentation data and metadata related to measuring and reporting results of outputting the presentation data. After measurement, the presentation data may be presented to an output device. The output device may be a display, a sound device or other computer output. Related statistics may be collected, for example, user identity, computer identity, time, duration, and interference from other sources. In the case of displayed presentation data, unblocked viewing area, and presentation data area size may also be collected. In an exemplary embodiment, the presence of a user and/or user interaction with the presentation data may be recorded and reported. The recorded data may be securely reported to a participating host or server, by a secure channel and/or by signing and/or encrypting.

14 Claims, 6 Drawing Sheets

METHOD AND APPARATUS FOR MEASURING PRESENTATION DATA EXPOSURE

TECHNICAL FIELD

This patent pertains to measuring presentation of data to a user, and more specifically to analyzing and reporting statistics related to presentation of data to an output device.

BACKGROUND

The importance of measuring advertising reach and effect is known. Internet advertisers routinely pay more for an advertisement when an ad results in a click-through or a subsequent purchase. The accurate monitoring of advertising delivery becomes more important as the competition for scarce advertising dollars increases.

U.S. Pat. No. 4,750,034 describes a system for embedding code signals in audio/video ("a/v") advertising for use in a mall or discotheque. The start and stop times associated with the code signals being played are recorded. A comparison of the audio played through the speakers with the audio presented to the sound system further confirm the presentation of the a/v advertising.

U.S. Pat. No. 4,967,273 describes a system for monitoring broadcast signals for their audio and visual quality. The programs are encoded with a recurring identification code for confirming the correct content is broadcast.

U.S. Pat. No. 4,857,999 describes a system for extracting characters from closed captioned information in a television broadcast to confirm the presence of a commercial in a broadcast program.

The increased use of TIVO™ and other digital video recorders allows users to postpone or eliminate viewing commercials. So called "pop-under" Internet advertising may result in ads technically being on a screen but that may never actually be visible. The increase in the number of media outlets and the pervasiveness of advertising contrasted with increasing consumer savvy and tools for managing advertising overload create a need for a system and method for measuring presentation data exposure.

SUMMARY

According to one aspect of the disclosure, advertising data and other messages of interest, or portions thereof, may be cryptographically identified and compared to actual data presented to an output device. The cryptographic identifier may be a hash sent separately from the advertising data and used to confirm the accuracy and/or completeness of a received advertisement. When the advertising is subsequently presented, a controller managing the presentation may report back the results of the presentation, for example, how much of a display was used and if any part of the image was covered by another window. Metadata embedded in the advertisement may be used to alert the controller to areas of the advertisement used for confirmation and for providing address information for providing feedback about the presentation of the advertisement or other presentation data. Alternate forms of verifying the accuracy and/or completeness of the received advertisement may be used, such as a digital signatures embedded in the advertising data.

Additional monitoring of user presence and behavior may be recorded. Service providers and advertisers may adjust their advertising rates based on a user being present during the duration of the ad display and other non-click through interaction with the advertisement such as mouse-overs.

A system of allowing providers/underwriters to subsidize the use or purchase of a computer by having a user watch a prescribed number of advertisements may use this feature to confirm that the user is fulfilling their contractual requirement. In the age of TVO™, other digital video recorders, intelligent set-top boxes, "pop-up" blockers, and both user indifference and user sophistication, the ability to confirm actual delivery of advertising to a TV or monitor may be used to both adjust advertising rates and provide an incentive for users to watch commercials.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance with the present invention, further discussion of such software and ICs, if any, will be limited to the essentials with respect to the principles and concepts of the preferred embodiments.

Figure 1:
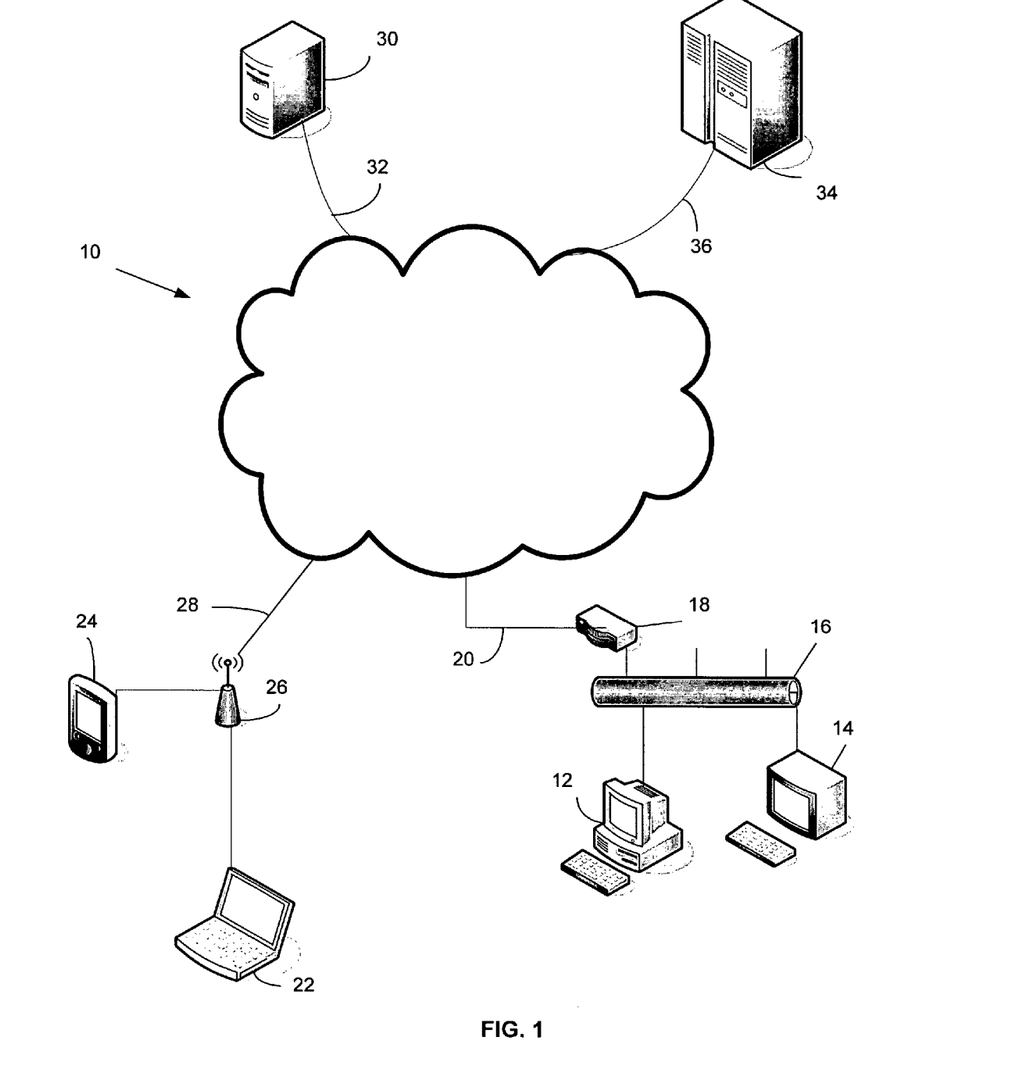
FIG. 1 is a simplified and representative block diagram of a computer network.
Figure 2:
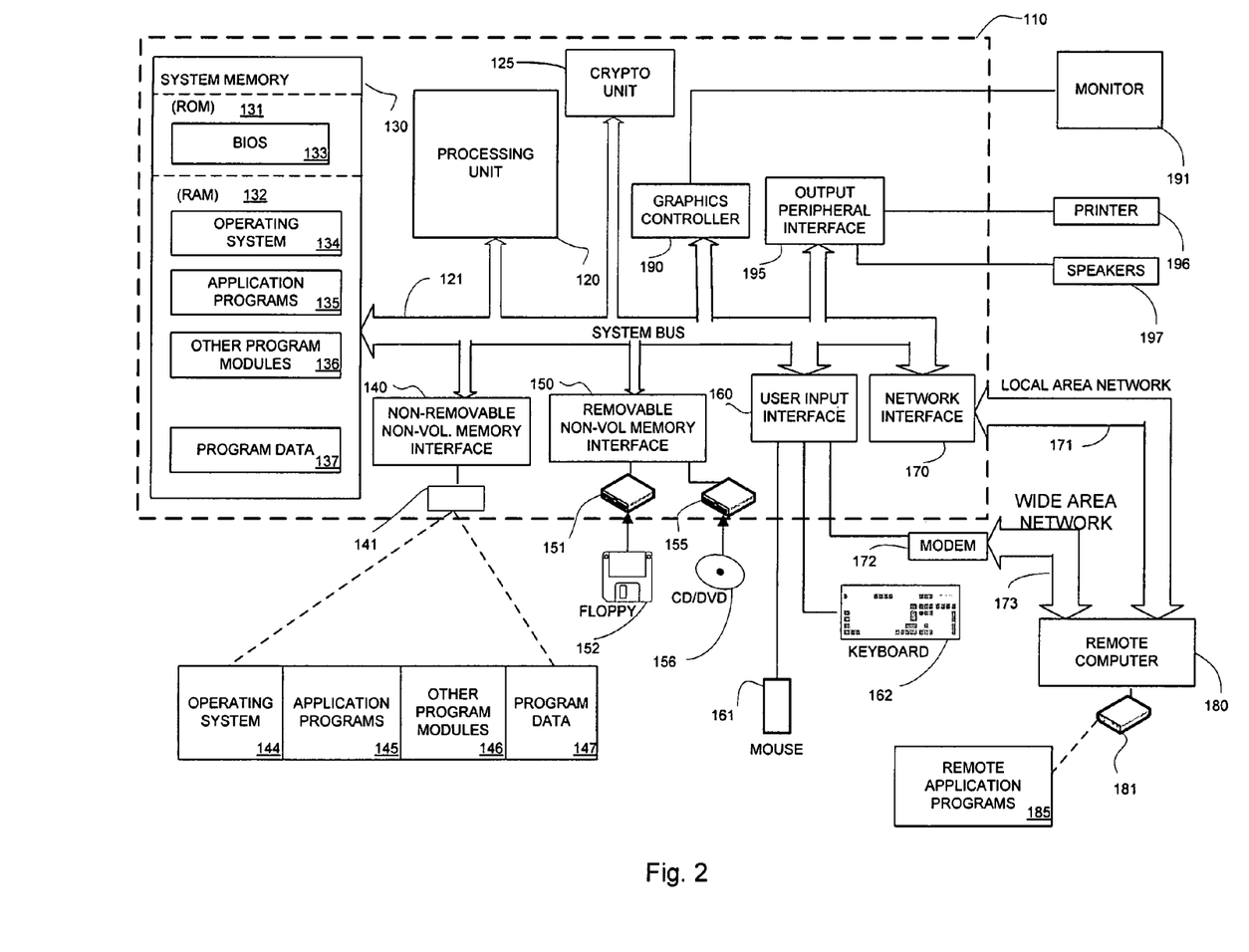
FIG. 2 is a block diagram of a computer that may be connected to the network of FIG. 1.
Figure 3:
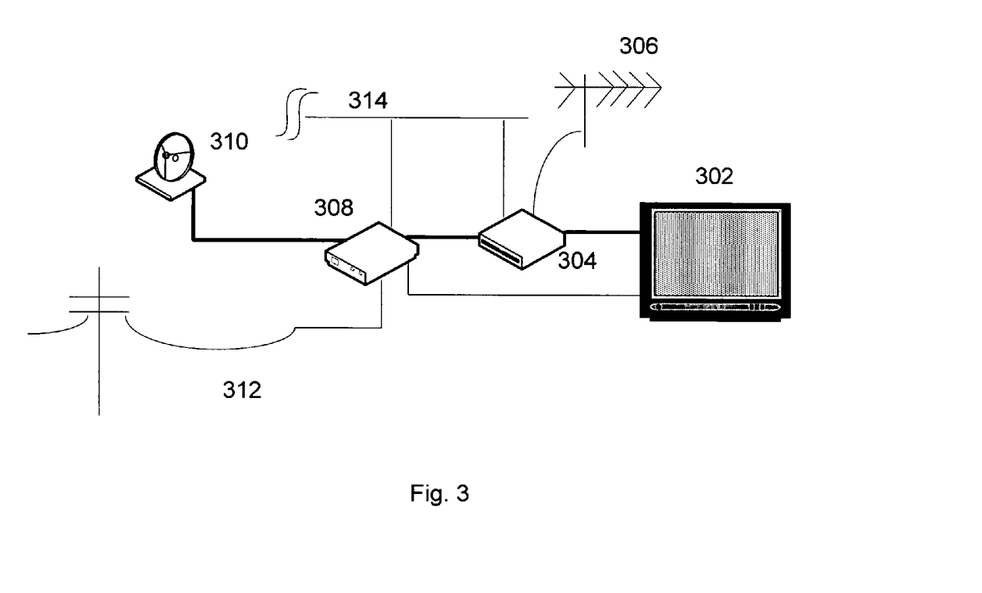
FIG. 3 is block diagram of television reception system.

FIGS. 1-3 provide a structural basis for the network and computational platforms related to the instant disclosure.

FIG. 1 illustrates a network 10 that may be used to implement a dynamic software provisioning system. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36.

FIG. 2 illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 may also include a cryptographic unit 125. Briefly, the cryptographic unit 125 has a calculation function that may be used to verify digital signatures, calculate hashes, digitally sign hash values, and encrypt or decrypt data. The cryptographic unit 125 may also have a protected memory for storing keys and other secret data. In addition, the cryptographic unit 125 may include an RNG (random number generator) which is used to provide random numbers. In other embodiments, the functions of the cryptographic unit may be instantiated in software or firmware and may run via the operating system or on a device.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and cursor control device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181.

The communications connections 170 172 allow the device to communicate with other devices. The communications connections 170 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

FIG. 3 is a simplified and representative block diagram of a television reception system. A television set 302 or equivalent tuner with monitor or projector may be coupled to a recording station 304, for example a digital video recorder, that is in turn coupled either to an antenna 306 or a receiver generically referred to as a set top box 308. The set top box 308 may receive broadcast signals from either a satellite dish 310 or cable system 312. Either or both the set top box 308 and the recording station 304 may be connected to a server, such as the server 34 of FIG. 1, via a network connection 314, such as, a dial-up connection or the Internet. The components shown in FIG. 3 are widely available commercially.

Figure 4:
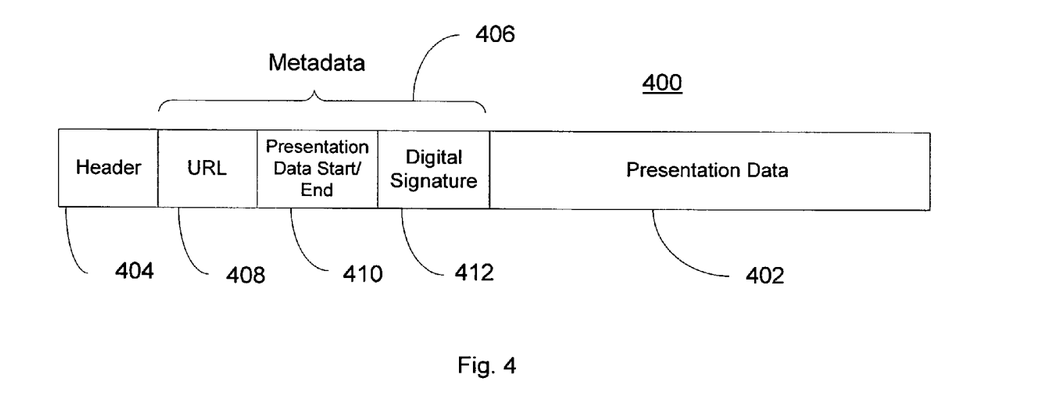
FIG. 4 is a representation of a data block including presentation and metadata.

FIG. 4 illustrates representative data useful for measuring data exposure. The data 400 may include presentation data 402, as well as a header 404 and metadata 406. The presentation data 402 may be still images, audio visual data, text, coupons, etc. While generically described as advertising, the presentation data may include announcements, political messages, etc. that may not technically be advertising. However, for the sake of convenience, the term advertising as used herein may incorporate other such presentation data 402.

The metadata 406 may also include priority data for reporting, that is, certain areas of the presentation data 402 may be of more interest than others when reporting observation data. That is, when a portion of the presentation data 402 is not presented, for example, covered by another window, it may be possible to report the priority of the portion that is uncovered.

The header 404 may incorporate commonly used information such as size, document/application type, checksum, addressing, etc. The metadata 406 may include a universal record locator ("URL") 408, start/stop information 410, and a digital signature 412, i.e., an encrypted hash and possibly the certificate or certificate chain used to sign the hash.

The URL 408 may be used to identify a website or server 34 address for reporting presentation data 402 exposure. In the case of visual data, start/stop information 410 may be used by the graphics controller 190 to assist in identifying the actual location of the presentation data in the graphics controller 190 memory, to aid in determining what image and to what extend the image is viewable. The digital signature 412 may be a signed hash of the presentation data or a signed hash of a subset of the presentation data, for example a section of the presentation data representing a brand logo.

In operation, an electronic information unit, such as a computer 110 (FIG. 2), a television 302, a set top box 308 or a recording station 304 (FIG. 3) may be adapted to report the presentation of data to a host or server, for example, server 34 (FIG. 1), either in real time or in a batch processing mode. The presentation data 402 may be audio data, motion video data, text data, an image, graphic data, scent data, or haptic (tactile) data. Haptic data may be used to drive a motor or vibrator, for example in a game controller (not depicted). To accomplish the reporting, the data 400 may be supplemented by metadata 406 and a controller, such as graphics controller 190, may be adapted to analyze the data 402 during presentation process using information from the metadata 406.

When data 400 intended for presentation is received via a port, such as interfaces 170 or 171 (FIG. 2), the data 400 may be routed to an appropriate controller by examining the data header 404. Audio information may be routed to an output peripheral interface 195, such as a sound board (not depicted), whereas video or graphic data may be routed to the graphics controller 190. When the data 400 arrives at the appropriate controller it may be processed according to logic or firmware associated with the controller. In an exemplary embodiment, the graphics controller 190 receives graphics information and parses the metadata 406. The presentation data 402 may be processed as needed and placed in display memory (not depicted). The start/stop data 410 may be used by the graphics controller 190 as a "hint" for locating the presentation data 402. When the presentation data 402 is located, the cryptographic unit 125, or a cryptographic capability in the graphics controller 190 itself, may be used to calculate a hash over the presentation data 402. The calculated hash may be compared to the decrypted digital signature 412. The cryptographic unit 125 may use a public key related to the supplier of the advertising or may use a derived key based on a known key and information in the metadata 406. Alternatively, the hash may be supplied to the computer 110 "out-of-band," e.g. from a website or via email. After the graphics controller 190 has verified the presentation data 402, further steps may be taken.

When the presentation data is verified, the graphics controller 190 may be confident that the data being presented contains reportable data, that is, data from a legitimate source that meets the requirements of some agreement between the advertiser and the user or a service provider. When the message is confirmed to contain reportable data, the graphics controller 190 may then evaluate the actual representation of the data to any potential viewer. Information corresponding to the display of the presentation data may be gathered. The information may include observation data corresponding to the amount of time the presentation data is presented to the display as well as the time of day. Other observation data gathered may correspond to an area covered by the presentation data, that is, the physical size of the presentation data 402 on the screen. In addition, data corresponding to a portion of the presentation data 402 appearing on the display, that is, not blocked by other windows, borders or banners may be captured. For example, a "pop-under" ad that is never exposed to the user may not be worth the same amount as an ad fully presented to the user.

Figure 6:
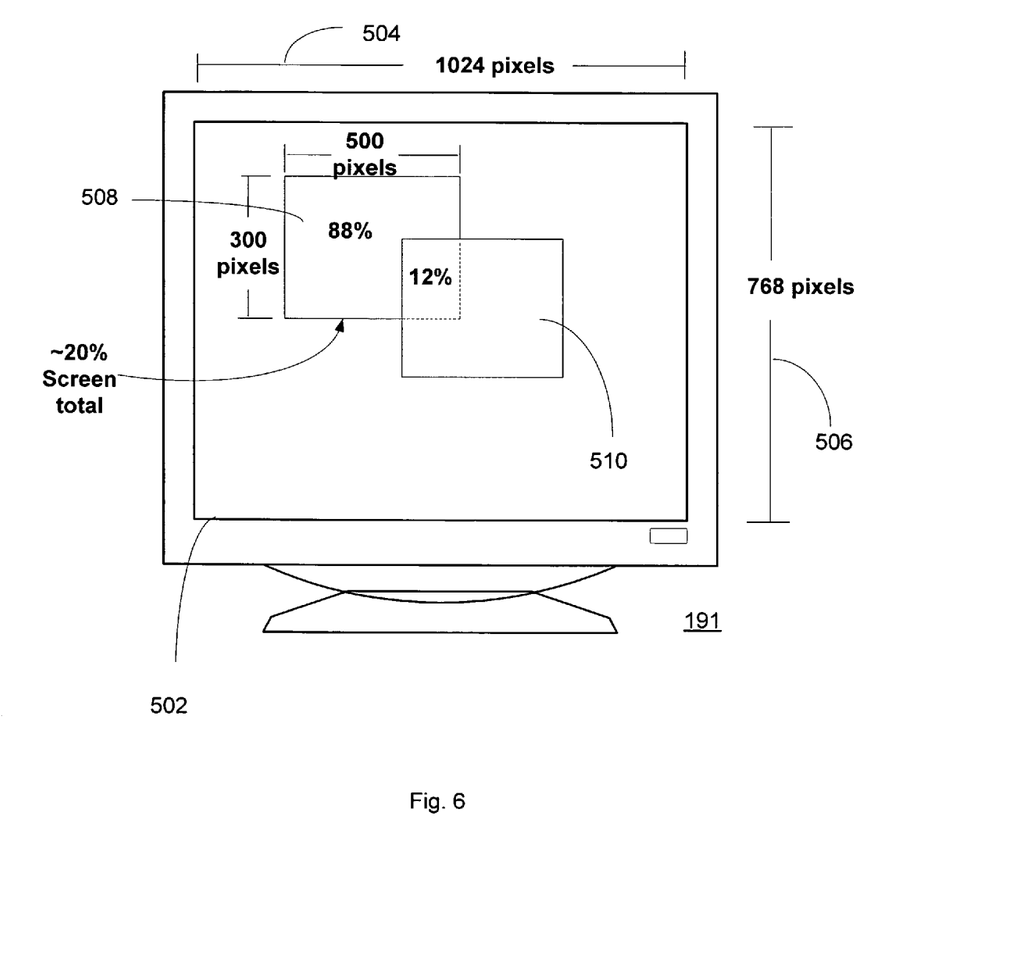
FIG. 6 illustrates a sample display screen with overlapping windows.

Turning briefly to FIG. 6, the concepts discussed above are illustrated. A monitor, for example, monitor 191, has a screen 502 with a viewing area configured to 1024 pixels (504), by 768 pixels (506). A window 508 comprising the presentation data 402 has dimensions 500 pixels by 300 pixels, or about 20% of the available screen space. However, an interposing window 510 covers about 12% of the window 508. The data gathered may then reflect that the window 508 displayed the presentation data 402 for a given time with a 20% display presence and 88% view-ability. Obviously, finer-grained descriptions may be made, such as, which 88% was displayed and, to the extent privacy is maintained, the identity of the blocking window. When the presentation data includes motion video, the observation data may also include information about the sequence of frames displayed and whether the sequence was repeated.

Figure 5:
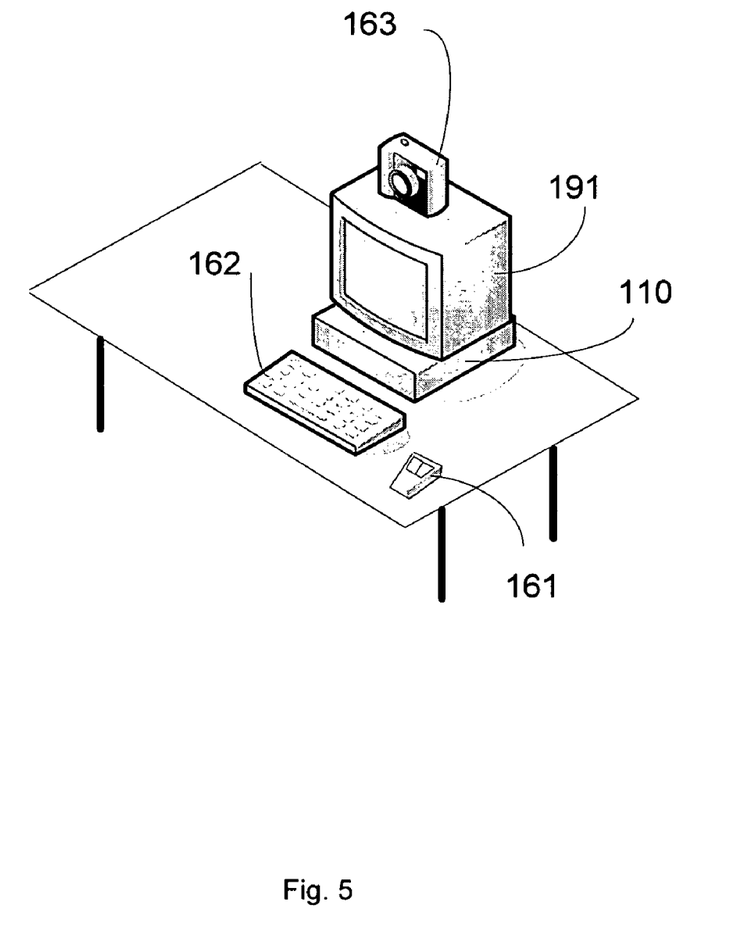
FIG. 5 is a block diagram of a computer work environment.

A further increase in the robustness of the reporting may be accomplished as illustrated using FIG. 5. A typical user work environment is shown, particularly, the computer 110, the mouse 161, the keyboard 162 and the monitor 191. An optional camera 163 may be used to capture images that may be used to determine, either through motion detection, pattern evaluation, or another technique whether a user is present. An advanced capability may use identification techniques such as iris scanning to determine which particular user is present. An additional element of observation data may include user interaction with the presentation data, for example, using an input device, such as the mouse 161, to roll a cursor (not depicted) over the presentation data or to move the window displaying the presentation data. Instructions about additional observation data to collect and report, such as mouse roll over and formatting for data such as time of day, may be included in the metadata 406.

After composing the observation data into the signal, the URL 408 from the metadata 406 may be used to forward the signal to the server. While a URL is shown in this example, any destination address, such as Internet Protocol ("IP") address and port number or other addressing scheme may be used. The signal may be sent via the same port 170, 171 used to receive the original data 400.

A graphics controller 190 has been used to illustrate the concepts disclosed, however, it is easily seen that similar concepts are easily extended to other output devices. For example, an audio signal may be verified in the same fashion as explained above, and observation data gathered with respect to the time of day, the volume settings of the computer/sound device and whether the presentation data 402 was played by itself or if other sounds, for example, music, was also present.

In the same fashion, the television system of FIG. 3 represents another environment for reporting presentation data 402 exposure. Both the set top box 308 and the recording station 304 each provide suitable environments for the operations described above. For example, the set top box 308 may receive advertising and programming that contain metadata for reporting. The set top box 308 will, in most cases, already have a cryptographic capability for decoding signals and securely storing usage data. The extension to verifying content, i.e. presentation data and reporting via a backchannel such as the cable connection 312 itself or via an Internet connection is well within the functional capability of most current set top boxes. Similarly, the recording station 304 may have a cryptographic capability, whether in hardware or software that can be used to both verify incoming data and sign/ encrypt outgoing signals.

Even digital broadcast messages received via antenna 306 and the recording station 304 are possible sources of data that can be verified, displayed, and reported. This may allow incentives to viewers for watching particular programming, for example, an "infomercial," in exchange for points or credits.

The notion of measuring presentation data may be extended to product placements in entertainment media such as movies and broadcast media, including recorded programming and sporting events. Product placement in entertainment media is a well established. Increasingly, advertising budgets target products from automobiles to consumer goods for prominent display in entertainment media. By identifying a product via the techniques discussed herein and embedding appropriate metadata in the delivery stream, the number of times the product is displayed may be reported to a product supplier or advertising agency.

Figure 7:
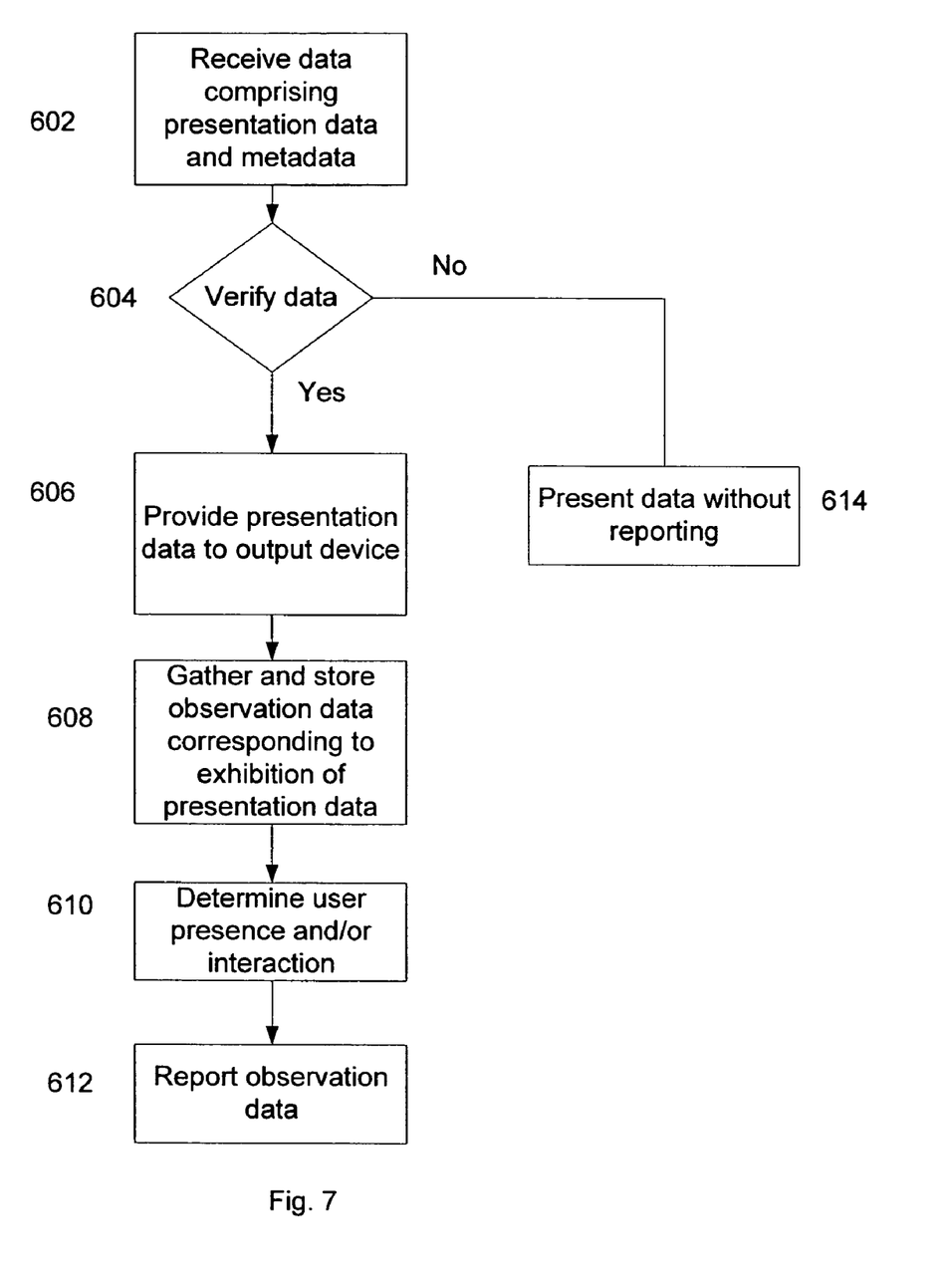
FIG. 7 is a flow chart of a method for measuring presentation data exposure.

Referring to FIG. 7, a flow chart of a method for measuring presentation data exposure is discussed and described. Data 400 may be received 602 at a computer 110, set top box 308, recording station 304, or other electronic information unit. The data 400 may include both presentation data 402 and metadata 406. The presentation data 402 may be advertising, product literature, notifications, etc. The metadata 406 may include information used to verify the presentation data 402, such as a digital signature 412. The metadata 406 may also include characteristics used for processing and reporting the presentation data 402, such as where to find specific information and what observation data to collect and report. The metadata 406 may also include information about a destination for the observation data, such as a server IP address or web site URL 408.

A characteristic of the data 400 or a portion of the data, such as the presentation data 402 may be verified 604 cryptographically. That is, a digital signature 412 may be verified, or a hash received separately, may be used to confirm that the presentation data 402 and any corresponding metadata 406 related to measurement and reporting, when signed, are authentic. It should be noted that in one embodiment, because the user receives a reward, for example, points, credits or satisfaction of a contractual obligation, the user may be motivated to conform to the rules surrounding observation of the presentation data, therefore, the user will have no motivation to block the communication between his or her computer/ device and the ad/media provider. This may allow a service provider to enter into a relationship where rebates or subsidized product are exchanged for the user's attention to certain advertisements or promotions.

After verifying the presentation data at block 604, execution may follow the yes branch and the presentation data is actually provided 606 to the output device. As above, the output device may be a visual display device, a speaker or headphone, a scent device or a haptics device.

Observation data may be collected 608 and stored, as described above. Observation data may relate to the characteristics of the presentation to the user, for example, size and exposure data. If requested and if the capability exists, a determination may be made 610 as to whether a user is present, and to what extent they are interacting with the presentation data 402, for example, tracking mouse-over events. The determination may be made using a standard input device such as monitoring the keyboard 162 or mouse 161, or by using another sensor such as a camera 163.

The observation data may vary depending on the output device. When the output device is a television, observation data such as mouse-over may not be relevant. However, other information about user reaction may be useful. For example, an amount of time a commercial is fully available may be reported, in the case where a user changes the channel or mutes the sound during a commercial. In an converged system where Internet and telephone are combined with a television, user actions to call an advertised phone number or bookmark a corresponding website within a time period of the commercial may be recorded and forwarded. Using a time stamp to note the time of display of the commercial and the time of a user action may be recorded to help determine if a cause and effect relationship can be made. Time stamp information may also be of use when a program, and its corresponding commercials, are time shifted using, for example, the recording device 304.

The stored observation data may then be used to report 612 the data corresponding to the presentation of the data on the output device, e.g. the observation data. As discussed, to provide user authentication as well as user privacy, the observation data may be signed and/or encrypted. In another embodiment, the observation data may be uploaded over a secure channel, for example a secure socket level 2 (SSL2) connection. The observation data may also be signed and encrypted, but the use of a secure channel between authenticated endpoints reduces the requirement for observation data processing.

In order to accurately report the observation data, particularly when the user receives value (points, rewards, or satisfaction of contract terms) in exchange for participation, the identity of the user or the computer 110 may need to be verified. Identity verification may be performed a the computer 110, for example by a login procedure. A more formal identity verification may require a two-level authentication process, by presenting "something you have plus something you know." For example, the user may be required to present a token such as a smart card and enter a password.

Another form of identity verification may occur later in the process when a server verifies a signature provided by the computer 110 or the output device in the process of evaluating the observation data.

When the data verification process fails at block 604, execution may proceed and the presentation data 402 may be presented 614 to its corresponding output device in a conventional fashion. In this case, no observation data needs to be collected since any report back will not be based on known presentation data 402.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention. present

We claim:

1. A computer adapted to report the presentation of data comprising:
   a port for bidirectional communication with an external server via a communication network for receiving advertising data;
   an audio/video controller coupled to the port, adapted to process and output the advertising data received via the port to an audio/video device and to report to an external server a statistic corresponding to processing and outputting at least a portion of the advertising data at an output of the audio/video device, wherein the advertising data includes presentation data, a digital signature, and metadata, the metadata including a universal record locator (URL) of a server to which to report the statistic and wherein the statistic includes at least a time when the advertising data is output, wherein the audio/video controller uses the metadata for one of identifying the at least a portion of the presentation data for cryptographic confirmation and identifying an address for sending the statistic related to the presentation data to the output device;
   a cryptographic unit to compute a hash for measuring at least a portion of the presentation data responsive to the audio/video controller presenting the presentation data, wherein the audio/visual device determines the authentication of the presentation data by comparing the hash of at least a portion of the presentation data calculated by the cryptographic unit to a previously determined hash, then displaying the presentation data if the two hashes match; and
   an output device coupled to the controller, wherein the controller causes the cryptographic unit to digitally sign the statistic and send the statistic corresponding to presentation of the at least the portion presentation data via the port to the server indicated by the URL.

2. The computer of claim 1, wherein the presentation data is one of an audio data, motion video data, text data, an image, and graphic data.

3. The computer of claim 1, wherein the controller establishes a secure channel with the server indicated by the URL when sending the statistic corresponding to processing and outputting the data via the port.

4. The computer of claim 1, wherein the audio/video device is a display and the statistic comprises one of first data corresponding to the time the presentation data is presented to the display, second data corresponding to an area of the display covered by the presentation data, and third data corresponding to a portion of the presentation data appearing on the display.

5. The computer of claim 4, wherein the presentation data is motion video information and the signal comprises fourth data corresponding to a sequence of frames displayed.

6. The computer of claim 1, wherein the cryptographic unit computes a hash for measuring the at least the portion of the data.

7. The computer of claim 5, wherein the data comprises metadata corresponding to a portion of the presentation data for calculating the hash.

8. The computer of claim 1, wherein the electronic information unit is one of a computer, a television, a set top box, and a digital video recorder.

9. The computer of claim 1, wherein the signal comprises observation data corresponding to user interactivity with the presentation data.

10. The computer of claim 1, further comprising a sensor to determine when a user is present at the display, wherein the sensor is one of a camera and an input device.

11. The computer of claim 1, wherein the signal comprises digitally signed data.

12. A method of determining and reporting advertising content exposure on the display of a computer comprising:

receiving advertising data at a computer, the advertising data comprising presentation data, header data, and metadata including a universal record locator (URL) of a server to which to report the statistic related to reporting actual display of the presentation data;

placing the presentation data in a display memory;

extracting information from the metadata used for identifying the at least a portion of the presentation data for cryptographic confirmation;

calculating a hash of the presentation data in the display memory identified by the metadata;

comparing the hash of the presentation data to a previously determined hash;

determining the presentation data is authentic when the calculated hash matches the previously determined hash;

displaying the presentation data on a computer monitor;

generating a statistic corresponding to displaying the presentation data, the statistic including at least a time when the presentation data is output;

signing the statistic; and reporting the statistic corresponding to the displaying the presentation data on the computer monitor to the server identified by the URL connected to the computer via a network.

13. The method of claim 12, further comprising verifying an identity associated with the output device, the identity comprising at least one of a user identifier and a computer identifier, wherein reporting statistics corresponding to the displaying the data comprises reporting the identity associated with the output device.

14. The method of claim 12, further comprising:

making a determination that a user is present, the determination based on one of input device data and sensor data; and reporting the determination that the user is present when reporting the statistic corresponding to the providing the data to the output device.

* * * * *

(12) EX PARTE REEXAMINATION CERTIFICATE (8022nd)
United States Patent
Frank et al.

(10) Number: US 7,669,056 C1
(45) Certificate Issued: Feb. 8, 2011

(54) METHOD AND APPARATUS FOR MEASURING PRESENTATION DATA EXPOSURE

(75) Inventors: Alexander Frank, Bellevue, WA (US); James Duffus, Seattle, WA (US)

(73) Assignee: Microsoft Corporation, Redmond, WA (US)

Reexamination Request:
No. 90/011,186, Aug. 25, 2010

Reexamination Certificate for:
Patent No.: 7,669,056
Issued: Feb. 23, 2010
Appl. No.: 11/092,041
Filed: Mar. 29, 2005

(51) Int. Cl.
*G06F 9/00* (2006.01)
*H04L 9/32* (2006.01)
*H04N 7/167* (2006.01)

(52) U.S. Cl. .................. 713/176; 713/1; 380/229; 380/232

(58) Field of Classification Search .................. None
See application file for complete search history.

(56) References Cited

U.S. PATENT DOCUMENTS

| | | | |
|---|---|---|---|
| 4,855,730 | A | 8/1989 | Venners et al. |
| 5,249,184 | A | 9/1993 | Woest et al. |
| 5,763,832 | A | 6/1998 | Anselm |
| 5,768,382 | A | 6/1998 | Schneier et al. |
| 5,774,870 | A | 6/1998 | Storey |
| 5,802,592 | A | 9/1998 | Chess et al. |
| 5,825,883 | A | 10/1998 | Archibald et al. |
| 5,844,986 | A | 12/1998 | Davis |
| 5,953,502 | A | 9/1999 | Helbig, Sr. |
| 6,148,417 | A | 11/2000 | da Silva |
| 6,158,657 | A | 12/2000 | Hall, III et al. |
| 6,253,224 | B1 | 6/2001 | Brice, Jr. et al. |
| 6,263,431 | B1 | 7/2001 | Lovelace et al. |
| 6,289,319 | B1 | 9/2001 | Lockwood |
| 6,441,813 | B1 | 8/2002 | Ishibashi |
| 6,463,534 | B1 | 10/2002 | Geiger et al. |
| 6,587,684 | B1 | 7/2003 | Hsu et al. |
| 6,690,556 | B2 | 2/2004 | Smola et al. |
| 6,694,000 | B2 | 2/2004 | Ung et al. |

(Continued)

FOREIGN PATENT DOCUMENTS

| | | |
|---|---|---|
| EP | 1061465 | 12/2000 |
| GB | 2378780 | 2/2003 |
| KR | 20010000805 A | 1/2001 |
| KR | 20020037453 A | 5/2002 |
| KR | 20050008439 A | 1/2005 |
| KR | 20050021782 A | 3/2005 |
| WO | WO-0135293 A1 | 5/2001 |
| WO | WO-0145012 A2 | 6/2001 |
| WO | WO-0163512 A1 | 8/2001 |
| WO | WO-0208969 A1 | 1/2002 |

OTHER PUBLICATIONS

International Search Report for PCT/US06/34622 mailed Jan. 16, 2007.

(Continued)

*Primary Examiner*—Andrew L Nalven (57) ABSTRACT

A method and apparatus for measuring data presentation is measured for authenticity and accuracy using a cryptographic capability. The data may include both presentation data and metadata related to measuring and reporting results of outputting the presentation data. After measurement, the presentation data may be presented to an output device. The output device may be a display, a sound device or other computer output. Related statistics may be collected, for example, user identity, computer identity, time, duration, and interference from other sources. In the case of displayed presentation data, unblocked viewing area, and presentation data area size may also be collected. In an exemplary embodiment, the presence of a user and/or user interaction with the presentation data may be recorded and reported. The recorded data may be securely reported to a participating host or server, by a secure channel and/or by signing and/or encrypting.

U.S. PATENT DOCUMENTS

| | | | |
|---|---|---|---|
| 6,708,176 | B2 | 3/2004 | Strunk et al. |
| 6,816,809 | B2 | 11/2004 | Circenis |
| 6,834,352 | B2 | 12/2004 | Shin et al. |
| 6,920,567 | B1 | 7/2005 | Doherty et al. |
| 6,954,728 | B1 | 10/2005 | Kusumoto et al. |
| 6,993,648 | B2 | 1/2006 | Goodman et al. |
| 7,054,468 | B2 | 5/2006 | Yang |
| 7,143,297 | B2 | 11/2006 | Buchheit et al. |
| 7,490,356 | B2 | 2/2009 | Lieblich et al. |
| 2001/0034711 | A1 | 10/2001 | Tashenberg |
| 2002/0002597 | A1 | 1/2002 | Morrell |
| 2002/0007310 | A1 | 1/2002 | Long |
| 2002/0046098 | A1 | 4/2002 | Maggio |
| 2002/0091569 | A1 | 7/2002 | Kitaura et al. |
| 2002/0123964 | A1 | 9/2002 | Kramer et al. |
| 2002/0129359 | A1 | 9/2002 | Lichner |
| 2002/0184508 | A1 | 12/2002 | Bialick et al. |
| 2002/0194132 | A1 | 12/2002 | Pearson et al. |
| 2003/0014323 | A1 | 1/2003 | Scheer |
| 2003/0027549 | A1 | 2/2003 | Kiel et al. |
| 2003/0028454 | A1 | 2/2003 | Ooho et al. |
| 2003/0035409 | A1 | 2/2003 | Wang et al. |
| 2003/0040960 | A1 | 2/2003 | Eckmann |
| 2003/0046026 | A1 | 3/2003 | Levy et al. |
| 2003/0088500 | A1 | 5/2003 | Shinohara et al. |
| 2003/0135380 | A1 | 7/2003 | Lehr et al. |
| 2003/0149671 | A1 | 8/2003 | Yamamoto et al. |
| 2003/0172376 | A1 | 9/2003 | Coffin |
| 2003/0229702 | A1 | 12/2003 | Hensbergen et al. |
| 2004/0003288 | A1 | 1/2004 | Wiseman et al. |
| 2004/0023636 | A1 | 2/2004 | Gurel |
| 2004/0034816 | A1 | 2/2004 | Richard |
| 2004/0039916 | A1 | 2/2004 | Aldis et al. |
| 2004/0054908 | A1 | 3/2004 | Circenis et al. |
| 2004/0064707 | A1 | 4/2004 | McCann et al. |
| 2004/0067746 | A1 | 4/2004 | Johnson |
| 2004/0093371 | A1 | 5/2004 | Burrows et al. |
| 2004/0128251 | A1 | 7/2004 | Adam et al. |
| 2004/0220858 | A1 | 11/2004 | Maggio |
| 2004/0225894 | A1 | 11/2004 | Colvin |
| 2005/0097204 | A1 | 5/2005 | Horowitz et al. |
| 2005/0144099 | A1 | 6/2005 | Deb et al. |
| 2005/0188843 | A1 | 9/2005 | Edlund et al. |
| 2005/0203801 | A1 | 9/2005 | Morgenstern et al. |
| 2006/0055506 | A1 | 3/2006 | Nicolas |
| 2006/0074600 | A1 | 4/2006 | Sastry et al. |
| 2006/0106920 | A1 | 5/2006 | Steeb et al. |
| 2006/0107328 | A1 | 5/2006 | Frank et al. |
| 2006/0206618 | A1 | 9/2006 | Zimmer et al. |
| 2006/0282319 | A1 | 12/2006 | Maggio |

OTHER PUBLICATIONS

Written Opinion for PCT/US06/34622 mailed Jan. 16, 2007.
International Search Report for PCT/US05/40966 mailed Jul. 24, 2008.
Written Opinion for PCT/US05/40966 mailed Jul. 24, 2008.
Qiao et al., "MiSer; An Optimal Low–Energy Transmission Strategy for IEEE 802.11a/h", Sep. 2003, pp. 161–175, obtained from ACM.
Schneier, B, "Applied Cryptography, Second Edition: Protocols, Algorithms, and Source Code in C (cloth)".
Goering, Richard, "Web Venture Offers Metered Access to EDA Packages—Startup Winds Clocks By–The–Hour Tools (e*ECAD Will Launch Web Site That Provides Pay–Per–Use and Pay–Per–Hour Access to Range of Chip Design Software)," Electronic Engineering Times, Nov. 6, 2000, p. 1.
Chen Zemao: Wu Xiaoping; Tang Weimin; "A Malcious Code Immune Model Based on Program Encryption," Wireless Communication, Networking and Mobile Computing, 2008, WiCOM '08, 4th International Conference on Oct. 12–14, 2008 pp. 1–5.
Mufti, M; Khanu, A; "Design and Implementation of a Secure Mobile IP Protocol;" Networking and Communication, 2004, INCC 204, International Conference on Jun. 11–13, 2004, pp. 53–57.
Davida, G.I.; Matt B.J.; Unix Guardians: Active User Intervention in Data Protection; erospace Computer Security Applications Conference, Fourth Dec. 12–16, 1988 pp. 199–204.
Morales, Tatiana, "Understanding Your Credit Score," Apr. 30, 2003, http://www.cbsnewscom/stories/2003/04/29/earlyshow/contributors/raymartin/main551521.shtml.
"Achieving Peak Performance: Insights From a Global Survey on Credit Risk and Collections Practices," GI Group Pamphlet, pp. 1–11 (2002, 2004).
"Equifax Business Solutions—Manage Your Customers," three pages printed from http://www.equifax.com/sitepages/biz/smallbiz/?sitepage=managecustomers on Oct. 14, 2005.
"Prequalification Using Credit Reports," two pages from http://www.credco.com/creditreports/prequalification.htm on Oct. 14, 2005.
Gao et al., "Online Advertising—Taxonomy and Engineering Perspectives," http://www.egnr.sjsu.edu/gaojerry/report/OnlineAdvertising%20.pdf.
Oshiba et al., "Personalized Advertisement—Duration Control for Streaming Delivery," http://taylorandfrancis.metapress.com/(5bd10m45zcwe0mapqwuytz55)/app/home/conbribution.asp?referrer=parent&backto=issue,3,13:journal,20,26:linkingpublicationresults, 1:104124.1.
Yue et al., "The Reward Based Online Shopping Community," Routledge, vol. 10, No. 4, Oct. 1, 2000, http://delivery.acm.org/10.1145/650000/641012/p21–oshiba.pdf?key1=64101&key2=3144513311&coll=GUIDE7dl=Guide&CDIF=6149088&CFTOKEN=37344501.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 12 is confirmed.

Claims 2-11, 13 and 14 were not reexamined.

* * * * *